US012774180B2

(12) United States Patent
Hooper et al.

(10) Patent No.: US 12,774,180 B2
(45) Date of Patent: Oct. 27, 2026

(54) MOBILE JETTISON RACK

(71) Applicant: The United States of America, as represented by the Secretary of the Navy, Arlington, VA (US)

(72) Inventors: Ralph David Hooper, Lemon Grove, CA (US); William Chambers, Jamul, CA (US); Christopher Zirkle, Oceanside, CA (US); Taylor Doolittle, San Diego, CA (US); Karl Anders Lindman, Chula Vista, CA (US); Joshua James Erick, San Diego, CA (US); Nigel Holman, San Marcos, CA (US); Kelly Krueger, La Mesa, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 18/925,375

(22) Filed: Oct. 24, 2024

(65) Prior Publication Data

US 2026/0116680 A1 Apr. 30, 2026

(51) Int. Cl.
*B65G 67/60* (2006.01)
*B63B 27/14* (2006.01)

(52) U.S. Cl.
CPC .......... *B65G 67/603* (2013.01); *B63B 27/143* (2013.01)

(58) Field of Classification Search
CPC ..... B65G 67/603; B63B 27/00; B63B 27/143; B63B 8/00; B63C 3/00; B63C 3/06
USPC ........................................... 114/27, 343, 375
See application file for complete search history.

(56) References Cited

U.S. PATENT DOCUMENTS

| | | | | |
|---|---|---|---|---|
| 5,603,600 | A * | 2/1997 | Egan | B60P 3/1058 414/478 |
| 6,164,236 | A | 12/2000 | Liu | |
| 8,950,973 | B2 * | 2/2015 | Wilbanks | B63C 3/06 405/3 |
| 10,118,679 | B2 | 11/2018 | Stave | |
| 2013/0279982 | A1 * | 10/2013 | Wilberts | B63C 3/06 405/3 |

FOREIGN PATENT DOCUMENTS

| | | |
|---|---|---|
| DE | 102012005136 A1 | 6/2014 |

* cited by examiner

*Primary Examiner* — Lars A Olson
(74) *Attorney, Agent, or Firm* — Naval Information Warfare Center, Pacific; Kyle Eppele; Andrew J. Cameron

(57) ABSTRACT

A mobile jettison rack includes a base frame, a lift jack, and a ramp. The lift jack is coupled to the base frame and includes a wheel that is configured to contact a deck of a ship to elevate and mobilize the base frame over the deck when the lift jack is extended. The ramp includes a fixed ramp portion and an adjustable ramp portion. The fixed ramp portion is inclined towards a jettison side of the mobile jettison rack and is configured to receive and support a container that is to be emergently jettisoned towards the jettison side and over an outboard side of the ship. The adjustable ramp portion is coupled to the fixed ramp portion and is inclined towards the jettison side. The adjustable ramp portion has a length that is selectively adjustable to adjust a total length of the ramp.

19 Claims, 9 Drawing Sheets

MOBILE JETTISON RACK

FEDERALLY-SPONSORED RESEARCH AND DEVELOPMENT

The United States Government has ownership rights in one or more inventions provided in this disclosure. Licensing inquiries may be directed to Office of Research and Technical Applications, Naval Information Warfare Center Pacific, Code 72110, San Diego, CA, 92152; (619) 553-5118; NIWC_Pacific_T2@us.navy.mil. Reference Navy Case No. 211393.

TECHNICAL FIELD

Aspects of the present disclosure relate generally to jettison devices, and in particular but not exclusively, relate to jettison devices for the emergency jettisoning of a container having combustible or otherwise hazardous materials overboard a ship.

BACKGROUND OF THE INVENTION

Some ships and offshore platforms may have a need to carry, transport, and/or store a variety of potentially dangerous materials. Such materials may include fuel drums/containers, gas cylinders, explosives, or other combustible or otherwise hazardous materials. However, having these materials onboard may pose a risk to the ship, to the platform, and/or to their crews in the case of a fire, a leak, or other damage that may occur to the containers in which these dangerous materials are housed. Thus, containers housing dangerous materials are often kept in a location where they can be easily jettisoned overboard in case of an emergency for the safety of the crew and for the ship.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
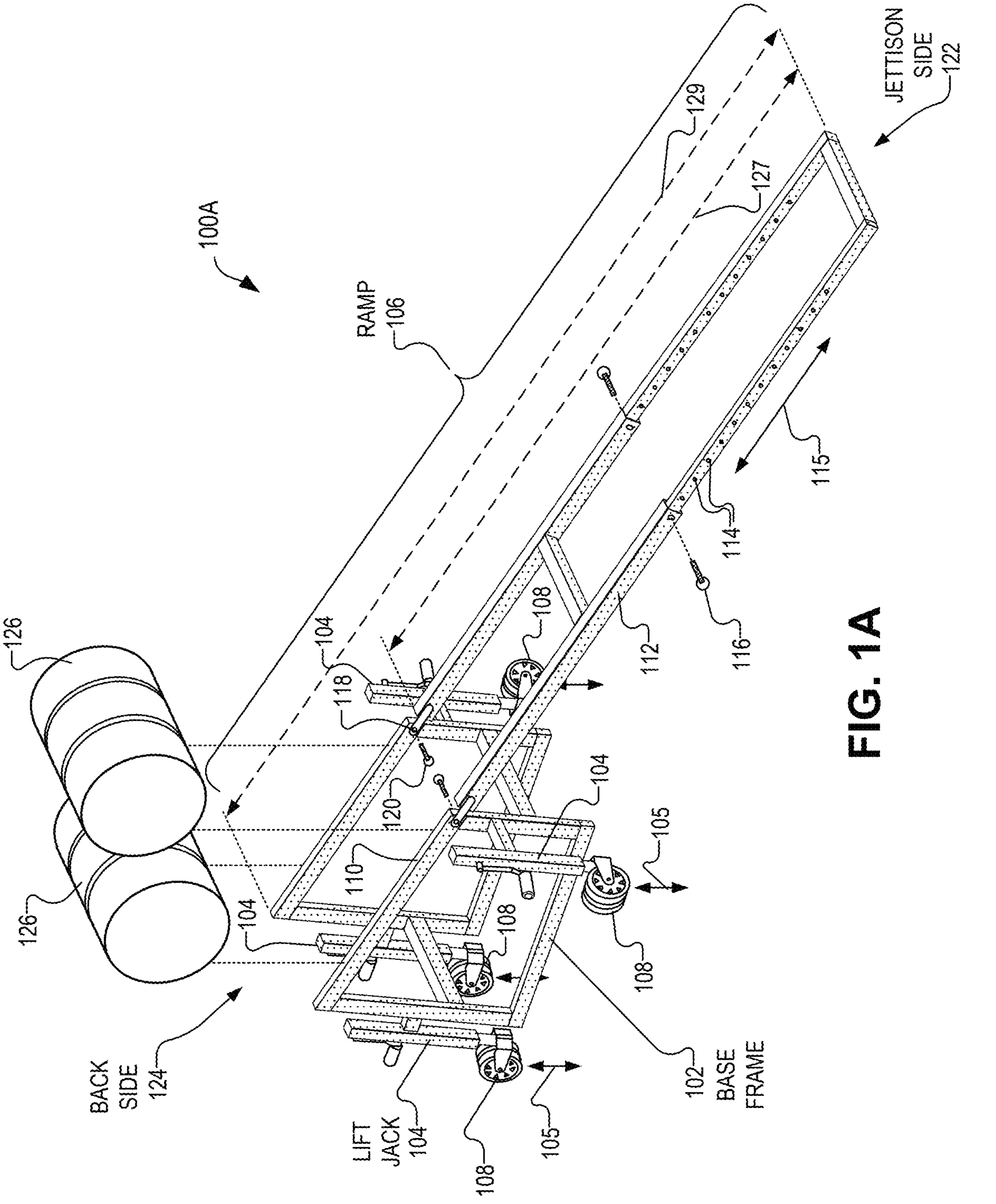
FIG. 1A illustrates an example mobile jettison rack, in accordance with aspects of the disclosure.

Embodiments of a mobile jettison rack are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, a ship may carry a container of combustible or otherwise hazardous material, which may need to jettisoned overboard in case of an emergency. Some ships may include a jettison device that is incorporated and permanently built-into the ship for the selective disposal of such containers. These fixed jettison devices are custom designed for a particular location on a particular ship with known dimensions and are designed with already-known onboard obstacles that need to be avoided or overcome for the jettisoning of the container. However, other ships do not include any integrated means for jettisoning a container of dangerous materials, yet they still have a need to carry them, as such.

Accordingly, aspects of the present disclosure provide a mobile jettison rack that includes one or more lift jacks having a wheel for elevating and mobilizing a base frame of the rack, enabling the mobile jettison rack to be easily moved and re-located on the deck of a ship, as needed. However, different ships may have different dimensions, different mounting locations, different obstacles, and so on that may impede the jettisoning of a container off the ship. Similarly, the same ship may have different dimensions, different mounting locations, or different obstacles, depending on where on the deck the mobile jettison rack is placed. Thus, aspects of the mobile jettison rack further include a ramp that includes both a fixed ramp portion and an adjustable ramp portion. The fixed ramp portion is inclined (e.g., towards an outboard side of the ship) and is configured to receive and support a container (e.g., cylindrical container, such as a fuel drum) during transport. The adjustable ramp portion is coupled to the fixed ramp portion and is inclined in the same direction. However, the adjustable ramp portion has a length that is selectively adjustable to adjust a total length of the ramp. Thus, the length of the ramp may be adjusted to ensure the effective and safe jettisoning of the container overboard the ship regardless of the particular dimensions of the ship on which the mobile jettison rack is on, regardless of where on the deck the rack is placed, regardless of the deck mounting locations, and regardless of the different obstacles that may be present on the ship. These and other aspects of the present disclosure will be described in more detail below.

FIG. 1A illustrates an example mobile jettison rack 100A, in accordance with aspects of the disclosure. Mobile jettison rack 100A is shown as including a base frame 102, at least one lift jack 104, and a ramp 106. Each lift jack 104 is shown as including a wheel 108. The ramp 106 is illustrated as including a fixed ramp portion 110 and an adjustable ramp portion 112. The adjustable ramp portion 112 is shown as including a plurality of perforations 114, retention pins 116, a mounting hole 118, and a retention pin 120. Mobile jettison rack 100A is also shown as including a jettison side 122 and a back side 124. Also shown in FIG. 1A are containers 126, length 127, and length 129.

Base frame 102 may be a rigid material such as metal. For example, base frame 102 may constructed from square, rectangular, and/or round metal tubes, such as steel tubes (e.g., carbon steel, galvanized steel, etc.). As shown, the base frame 102 may include several vertical and horizontal metal tubes to support or otherwise provide structural integrity to the mobile jettison rack 100A.

FIG. 1A illustrates lift jacks 104 as being coupled to the base frame 102. Although FIG. 1A illustrates mobile jettison rack 100A as including four (4) lift jacks 104, mobile jettison rack 100A may include any number of lift jacks 104, including one or more. As shown, each lift jack 104 may include a respective wheel 108. In some aspects, one or more of the wheels 108 are swivel wheels that are configured to rotate about an axis perpendicular to the deck (i.e., perpendicular to the surface on which the mobile jettison rack 100A is placed). Lift jacks 104 are configured to extend in a vertical direction 105 such that the wheels 108 contact the deck to elevate the base frame 102 over the deck. When the lift jacks 104 are extended with the wheels 108 contacting the deck, the base frame 102 is mobilized to allow movements of the mobile jettison rack 100A to different locations on the deck. In some examples, lift jacks 104 are mechanical jacks that utilize a manually operated (e.g., a hand crank) screw thread to extend the wheels 108. In other examples, lift jacks 104 are manually operated hydraulic jacks and/or air operated hydraulic jacks.

FIG. 1A further illustrates ramp 106 as coupled to the base frame 102. In some aspects, fixed ramp portion 110 and adjustable ramp portion 112, collectively, form the ramp 106, having a total length 129. The fixed ramp portion 110 is configured to receive and support one or more containers 126 that are to be emergently jettisoned towards the jettison side 122 and over an outboard side of a ship or other offshore platform. As will be described in more detail below, the base frame 102 may include one or more mounting rings (not shown in FIG. 1A) that are configured to receive a mounting strap for securing the containers 126 to the fixed ramp portion 110. In some examples, containers 126 are cylindrical containers, such as 50 or 55-gallon fuel drums. Furthermore, in the illustrated example, the fixed ramp portion 110 includes a pair of parallel tracks inclined towards the jettison side 122 of the mobile jettison rack 100A. The parallel tracks of the fixed ramp portion 110 may be spaced apart and inclined towards the jettison side 122, such that when the containers 126 are no longer secured to the fixed ramp portion 110, the containers 126 roll/slide down the ramp 106 over an outboard side of the ship.

In some aspects, the fixed ramp portion 110 is formed from the same rigid material as used to form the base frame 102. That is, the fixed ramp portion 110 may be constructed from metal (e.g., carbon steel, galvanized steel, etc.) square, rectangular, and/or round tubes.

Figure 1B:
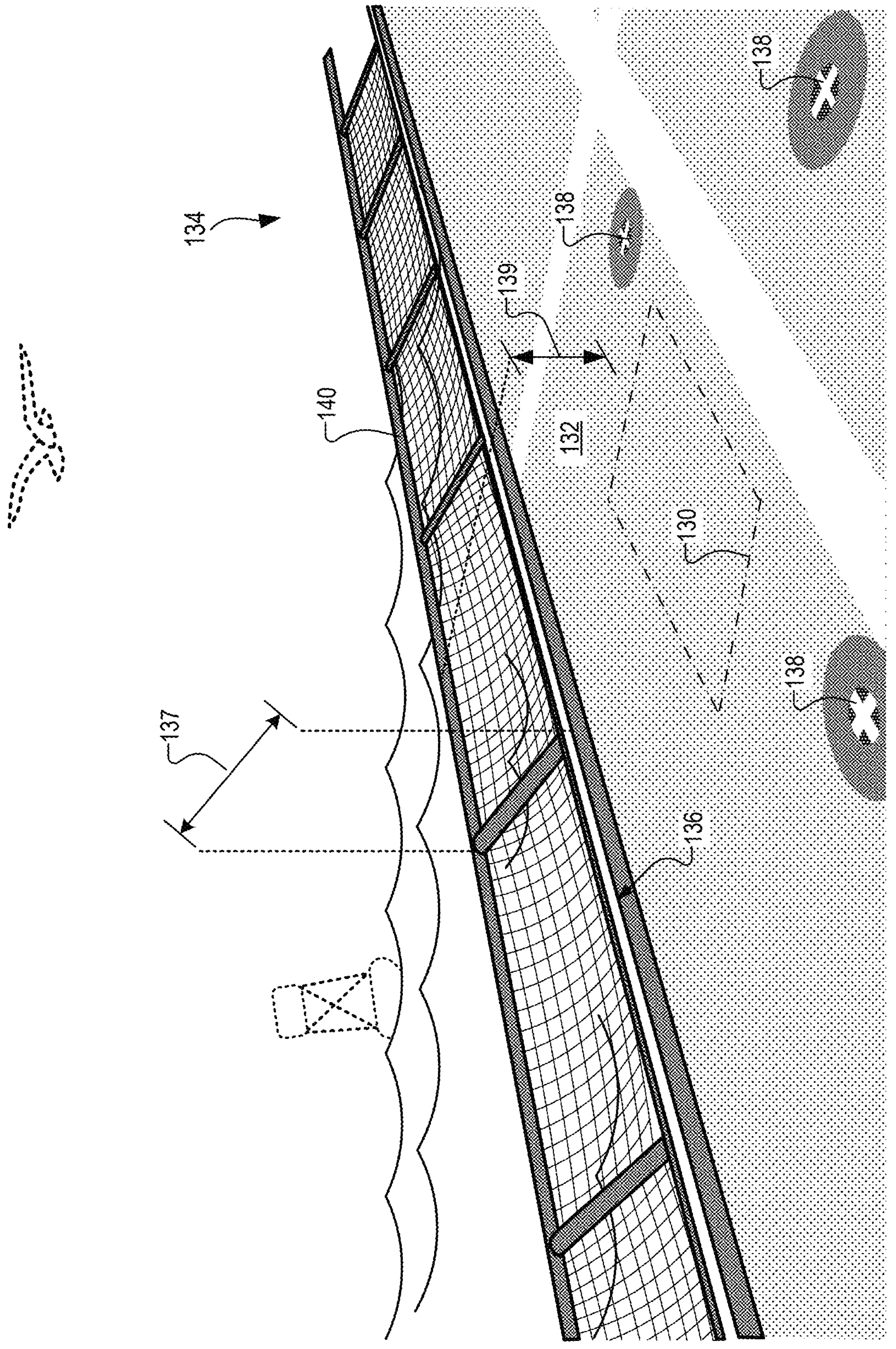
FIG. 1B illustrates an example mounting location on a deck of a ship for a mobile jettison rack, in accordance with aspects of the disclosure.

The mobility of the mobile jettison rack 100A allows for its placement on the deck of a ship or platform in a variety of locations. However, different ships may have different mounting locations, different dimensions, and/or different obstacles for jettisoning the containers 126 overboard. By way of example, FIG. 1B illustrates a mounting location 130 on a deck 132 of a ship 134 for mobile jettison rack 100A, in accordance with aspects of the disclosure. In the illustrated example, ship 134 is shown as including an outboard side 136, and deck 132 is shown as including a plurality of lashing points 138. Lashing points 138 may be integrated into the deck 132 of the ship 134 for securing cargo, equipment, and/or vehicles. For example, one or more of the lashing points 138 may be a flush or raised aircraft tie down, cloverleaf, D ring, crinkle bar, or other securing point available in the deck 132 of the ship 134.

The mounting location 130 of where the mobile jettison rack 100A is placed may depend on where available lashing points 138 are located. However, the location of the lashing points 138 on the deck 132 may vary from ship-to-ship or may even vary on ship 134, itself. For example, selecting the illustrated lashing points 138 may put the mounting location 130 a distance from the outboard side 136 that is larger or shorter as compared to other mounting locations. Increasing or decreasing the distance of the mounting location 130 from the outboard side 136 necessarily increases or decreases the distance that the mobile jettison rack 100A needs to jettison the containers 126 safely overboard the ship 134.

Furthermore, some ships, such as ship 134 may include a safety net 140 that is installed on the outboard side 136 of ship 134. Safety net 140 may be a framework that includes a nylon, steel, or other rope netting that is affixed to the outboard side 136 for crew safety. However, safety net 140 may be an obstacle for the jettisoning of a container 126 off the ship 134. In particular, safety net 140 may extend a distance 137 past the outboard side 136, further increasing the distance that the mobile jettison rack 100A needs to jettison the containers 126 from mounting location 130. In addition, safety net 140 may have a height 139 that may further obstruct the jettisoning of a container 126. In the illustrated example of FIG. 1B, height 139 is a distance from a top-most portion of the safety net 140 to a surface of the deck 132. Thus, the height 139 may be a distance above the surface of deck 132 or may be a distance below the surface of the deck 132 (e.g., if the safety net is mounted further down on the outboard side 136 of the ship 134).

Accordingly, the mobile jettison rack 100A includes an adjustable ramp for accommodating various mounting locations 130 on various platforms or on various ships. By way of example, referring back to FIG. 1A, ramp 106 includes adjustable ramp portion 112. Adjustable ramp portion 112 is coupled to the fixed ramp portion 110 and is inclined towards the jettison side 122, similarly to the fixed ramp portion 110. As shown, adjustable ramp portion 112 may have a length 127 that is selectively adjustable (along lateral direction 115). Adjusting the length 127 of the adjustable ramp portion 112 thus adjusts the total length 129 of ramp 106, allowing the mobile jettison rack 100A to be placed at a variety of mounting locations 130 at various distances from the outboard side 136 of the ship and/or to extend the jettisoning of container 126 past obstacles, such as safety net 140. Furthermore, in the illustrated example, the adjustable ramp portion 112 includes a pair of parallel tracks inclined towards the jettison side 122 of the mobile jettison rack 100A. The parallel tracks of the adjustable ramp portion 112 may be spaced apart and inclined towards the jettison side 122, such that when the containers 126 are no longer secured to the fixed ramp portion 110, the containers 126 roll/slide down the adjustable ramp portion 112 over an outboard side of the ship.

In some examples, adjustable ramp portion 112 includes a telescoping tube having a plurality of perforations 114. In some aspects, the telescoping tube includes at least two square metal (e.g., galvanized steel) tubes of differing diameters/outside dimensions. Thus, the adjustable ramp portion 112 may be extended or retracted along lateral direction 115, where a retention pin 116 may then be inserted into at least one of the perforations 114 to fix the length 127 of the adjustable ramp portion 112.

In some aspects, the adjustable ramp portion 112 is selectively removable. That is, the adjustable ramp portion 112 may be decoupled from the fixed ramp portion 110. For example, the illustrated example of FIG. 1A shows the adjustable ramp portion 112 as including a mounting hole 118 and a retention pin 120. When inserted into the mounting hole 118, retention pin 120 secures the adjustable ramp portion 112 to the fixed ramp portion 110. In some aspects, removing/decoupling the adjustable ramp portion 112 enables for storage of the adjustable ramp portion 112 when not in use and enables the easier movement of the mobile jettison rack 100A. For example, in some implementations, the adjustable ramp portion 112 is inclined and has a length 127 extends over the outboard side of a ship below the surface of the deck. Thus, the adjustable ramp portion 112 may contact the deck or other obstacles if the mobile jettison rack 100A is moved while the adjustable ramp portion 112 is still attached. The selective decoupling of the adjustable ramp portion 112 may therefore allow for easier movement of the mobile jettison rack 100A without damage or interference with other features of the ship/deck.

Figure 1C:
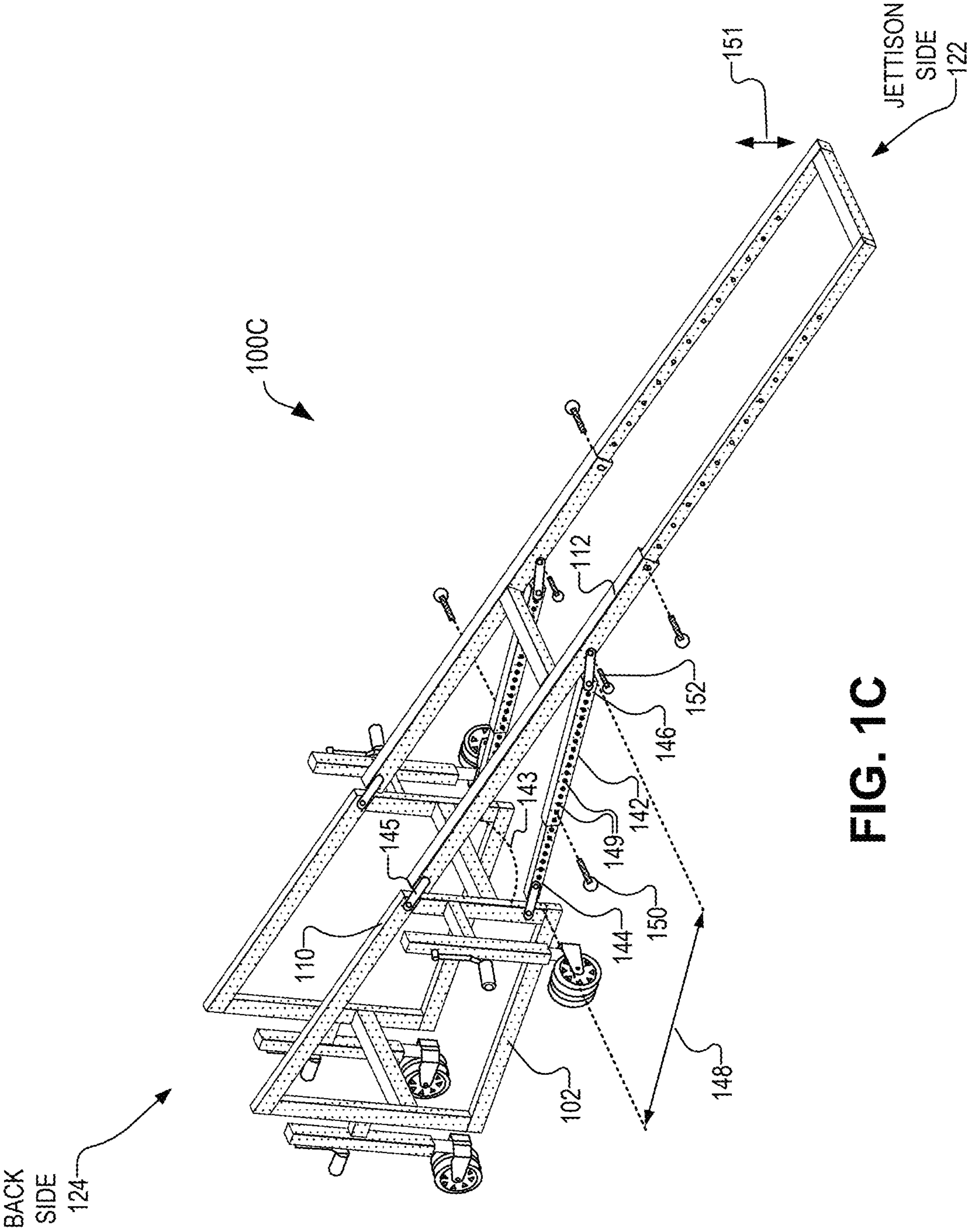
FIG. 1C illustrates an example mobile jettison rack that includes a ramp support member, in accordance with aspects of the disclosure.

FIG. 1C illustrates an example mobile jettison rack 100B that includes a ramp support member 142, in accordance with aspects of the disclosure. Mobile jettison rack 100B is one possible implementation of mobile jettison rack 100A of FIG. 1A, where like numerals are used to refer to like elements.

As shown in FIG. 1C, ramp support member 142 is coupled to the base frame 102 and to the adjustable ramp portion 112 to set an incline angle 143 of the adjustable ramp portion 112. In particular, ramp support member 142 includes a first end 144 coupled to the base frame 102 and a second end 146 coupled to the adjustable ramp portion 112. In the illustrated example, incline angle 143 is the angle of the adjustable ramp portion 112 with respect to a vertical member of the base frame 102 (e.g., the angle with respect to an axis perpendicular to the deck).

In some examples, a length 148 of the ramp support member 142 is selectively adjustable to adjust the incline angle 143. For example, ramp support member 142 may include one or more telescoping tubes having a plurality of perforations (e.g., holes) 149. A retention pin 150 may be inserted into at least one of the perforations 149 to fix the length 148 of the ramp support member 142. In some examples, the adjustable ramp portion 112 is pivotably coupled to the fixed ramp portion 110. For instance, FIG. 1C illustrates a hinge 145 for pivotably coupling the adjustable ramp portion 112 to the fixed ramp portion 110. Thus, in some aspects, increasing the length 148 of the ramp support member 142 pivots the adjustable ramp portion 112 upwards, increasing the incline angle 143. Similarly, decreasing the length 148 decreases the incline angle 143. As shown in FIG. 1C, increasing or decreasing the incline angle 143 causes vertical adjustments 151 of the adjustable ramp portion 112 near the jettison side 122. Thus, the incline angle 143 may be selectively adjusted by way of the ramp support member 142 to overcome one or more obstacles (e.g., safety netting 140 of FIG. 1B) for the safe jettisoning of a container.

As mentioned above, in some examples, the adjustable ramp portion 112 may be selectively decoupled from the fixed ramp portion 110 for storage and/or for movement of the mobile jettison rack 100C. Thus, in some aspects, the second end 146 of the ramp support member 142 may be selectively decoupled from the adjustable ramp portion 112 to allow the adjustable ramp portion 112 to be removed. For instance, in the illustrated example, ramp support member 142 includes a retention pin 152, that when installed, secures the second end 146 to the adjustable ramp portion 112. When the retention pin 152 is removed by a user, the second end 146 is decoupled/disconnected from the adjustable ramp portion 112. Furthermore, as will be described below with reference to FIG. 3A, in some examples, the first end 144 of the ramp support member 142 is rotatably coupled to the base frame 102 to enable the ramp support member 142 to rotate to an interior of the base frame 102 for storage when the second end 146 is decoupled from the adjustable ramp portion 112.

Figure 1D:
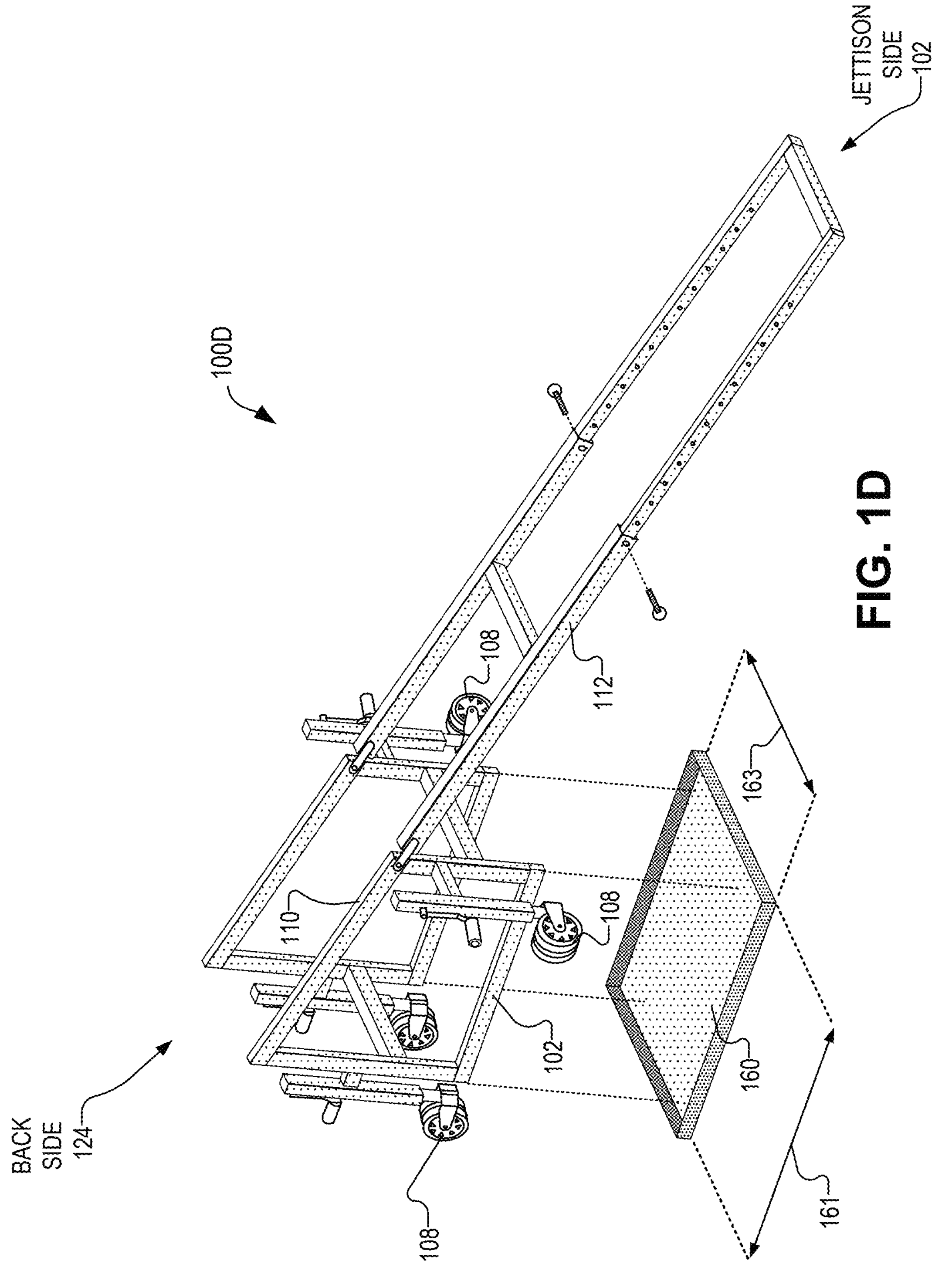
FIG. 1D illustrates an example mobile jettison rack that includes a drip pan, in accordance with aspects of the disclosure.

FIG. 1D illustrates an example mobile jettison rack 100D that includes a drip pan 160, in accordance with aspects of the disclosure. Mobile jettison rack 100D is one possible implementation of mobile jettison rack 100A of FIG. 1A, where like numerals are used to refer to like elements.

As mentioned above, one or more containers 126 of combustible or otherwise hazardous materials may be placed/secured to the fixed ramp portion 110. Such materials may be in a liquid or in a solid form (e.g., powder, granule, etc.). However, in some scenarios the containers 126 may become damaged, improperly stored, or otherwise compromised, such that the stored material may escape/leak. Accordingly, drip pan 160 may be disposed between the deck and the fixed ramp portion 110 to retain any materials that may escape from the containers 126. In the illustrated example of FIG. 1D, drip pan 160 is coupled to a bottommost side of the base frame 102. Drip pan 160 may be constructed from a rigid material such as sheet metal or plastic and includes side edges/lips to contain the leaking material. Drip pan 160 may also be dimensioned to fit between the wheels 108. For example, drip pan 160 is shown as having a length 161 and a width 163 that are less than the respective distances between the wheels 108 of the mobile jettison rack 100D.

Figure 1E:
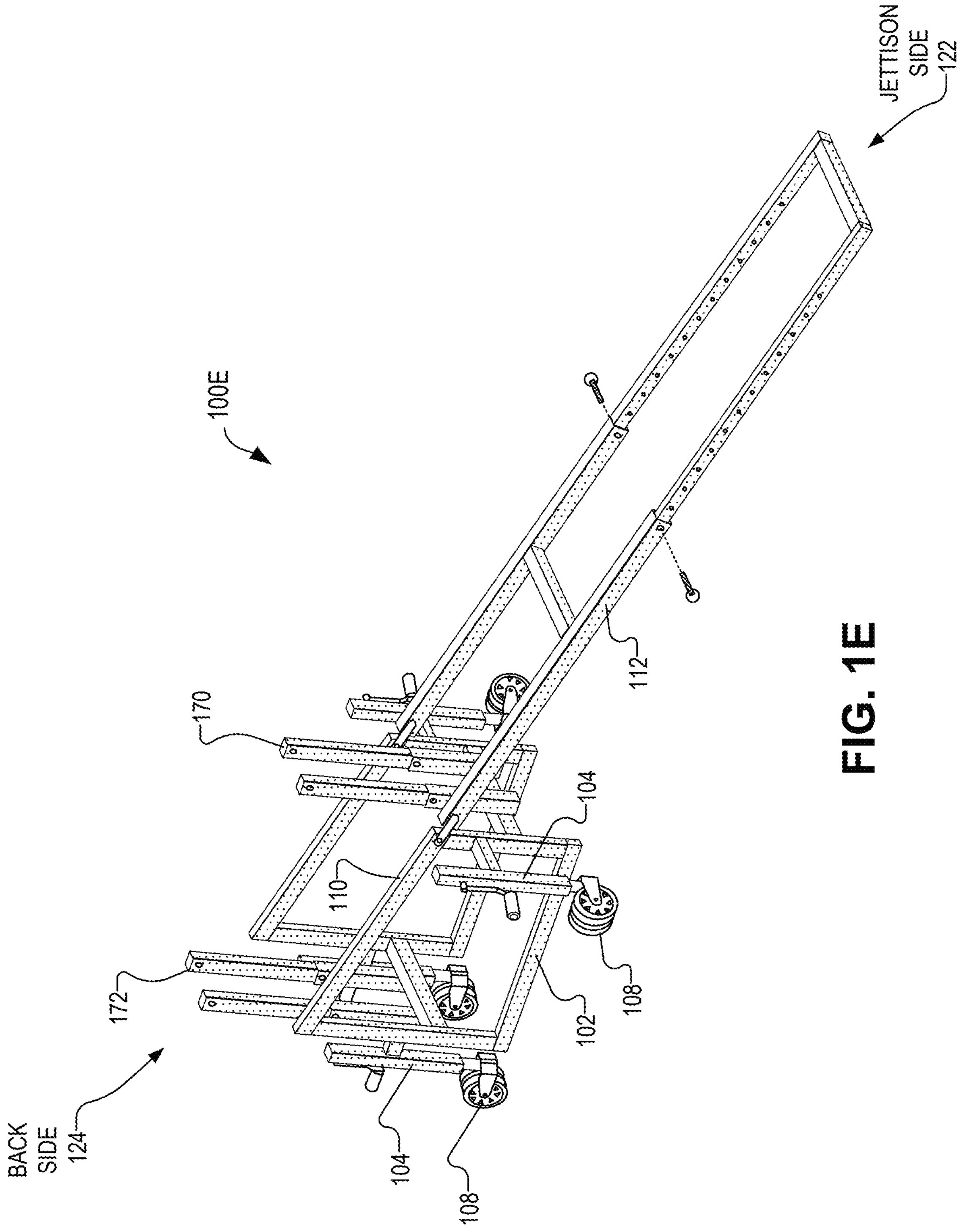
FIG. 1E illustrates an example mobile jettison rack that includes both front and rear stops, in accordance with aspects of the disclosure.

FIG. 1E illustrates an example mobile jettison rack 100E that includes front stops 170 and rear stops 172, in accordance with aspects of the disclosure. Mobile jettison rack 100E is one possible implementation of mobile jettison rack 100A of FIG. 1A, where like numerals are used to refer to like elements.

In some aspects, the front stops 170 and/or the rear stops 172 are formed from the same rigid material as used to form the base frame 102. That is, the front stops 170 and the rear stops 172 may be constructed from metal (e.g., carbon steel, galvanized steel, etc.) square, rectangular, and/or round tubes. As shown, front stops 170 and rear stops 172 are coupled to the base frame 102 and are positioned to extend vertically above a top surface of the fixed ramp portion 110.

In some aspects, rear stops 172 are coupled to the base frame 102 at the back side 124 to provide additional support to the containers 126 when they are secured/strapped to the fixed ramp portion 110. In addition, the rear stops 172 may prevent the containers from rolling or otherwise falling off of the back side 124 of mobile jettison rack 100E (e.g., due to rolling or pitching of the ship). In some examples, rear stops 172 are selectively removable from the base frame 102. For instance, rear stops 172 may include one or more retention pins (not shown in FIG. 1E) for securing the rear stops 172 to the base frame 102. The selective removal of the rear stops 172 may enable the loading of additional containers 126 and/or the removal of existing containers 126 to/from the back side 124 of the mobile jettison rack 100E while deployed on the deck of a ship.

In some aspects, front stops 170 are coupled to the base frame 102 towards the jettison side 122 of the fixed ramp portion 110. The front stops 170 are coupled to provide additional support and prevent the containers 126 from falling off the fixed ramp portion 110 when the mobile jettison device 100E is moved. For example, in some aspects, lift jacks 104 may be activated to extend the wheels 108 downward, elevating the base frame 102, to relocate the mobile jettison rack 100E. However, one or more containers may already be secured to the fixed ramp portion 110. Thus, in some aspects, the front stops 170 may be installed before moving the mobile jettison rack 100E to further secure and prevent an inadvertent jettisoning of the containers 126. In some examples, front stops 170 may include one or more retention pins (not shown in FIG. 1E) for temporarily securing the front stops 170 to the base frame 102. Once the mobile jettison rack 100E is relocated to an intended mounting location, the lift jacks 104 may be retracted, lowering the base frame 102 to the deck, where the front stops 170 are then removed.

Figures 2A, 2B, 2C:
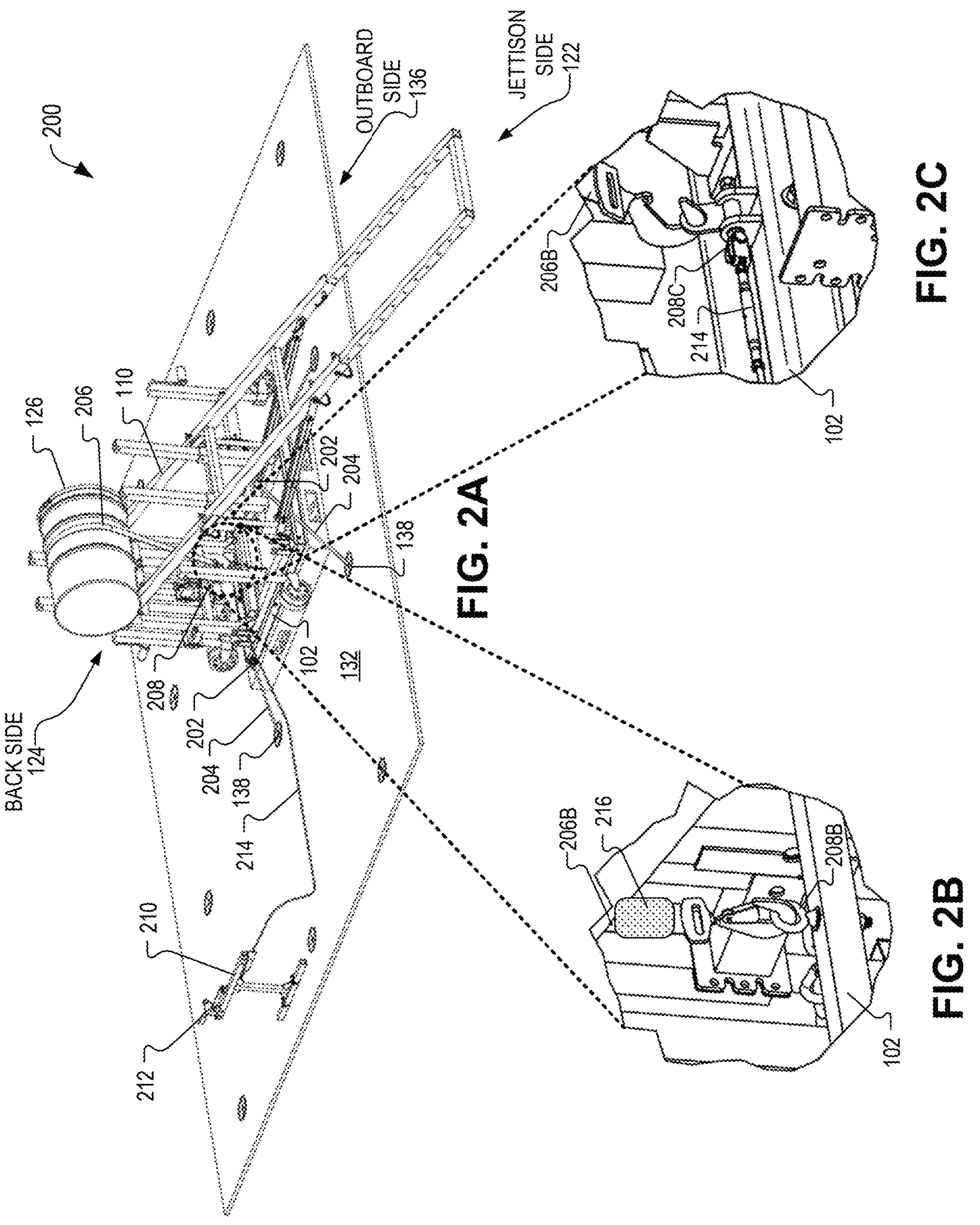
FIG. 2A illustrates an example mobile jettison rack that includes a mounting ring for receiving a mounting strap to secure a container, in accordance with aspects of the disclosure.
FIG. 2B illustrates an example mounting ring and a mounting strap that includes a fusible link, in accordance with aspects of the disclosure.
FIG. 2C illustrates an example mounting ring that includes a latch, in accordance with aspects of the disclosure.

FIG. 2A illustrates an example mobile jettison rack 200, in accordance with aspects of the disclosure. Mobile jettison rack 200 is one possible implementation of mobile jettison rack 100A of FIG. 1A, where like numerals are used to refer to like elements. The illustrated example of mobile jettison rack 200 is shown as including a plurality of tie-down rings 202, a plurality of tie-down straps 204, a mounting strap 206, a mounting ring 208, an override support structure 210, a lever 212, and a linkage 214.

FIG. 2A illustrates mobile jettison rack 200 installed/mounted to the deck 132 with jettison side 122 facing the outboard side 136 of the ship. As shown, the base frame 102 may include several tie-down rings 202 that are configured to receive one or more straps 204 for securing the base frame 102 to one or more lashing points 138. In some examples, straps 204 are ratchet straps made from nylon, polyester, or other heavy-duty material. In another example, straps 204 are metal chains, such as ratchet or lever chain binders.

The base frame 102 of FIG. 2A is also shown as including one or more mounting rings 208. The mounting rings 208 are configured to receive a mounting strap 206 for securing the container 126 to the fixed ramp portion 110. When installed, mounting strap 206 secures the container 126 to prevent sliding and/or rolling of the container 126 off the fixed ramp portion 110. Further details regarding possible implementations of the mounting ring 208 and mounting strap 206 are shown in FIGS. 2B and 2C.

For example, FIG. 2B illustrates an example mounting ring 208B coupled to the base frame 102. In addition, FIG. 2B illustrates an example mounting strap 206B that includes a fusible link 216. In some aspects, the fusible link 216 is configured to automatically fail and release the container 126 from the fixed ramp portion 110 to jettison the container 126. For example, fusible link 216 may be a metal or other material with a known failure threshold that is selected to provide an automatic jettisoning of the container 126 in emergent situations. That is, the fusible link 216 may be selected to fail in response to heat, fire, and/or exposure to certain chemicals. The failure of the fusible link 216 thus releases the strap from restraining the container 126, allowing the jettisoning of the container 126 over the outboard side 136 of the ship.

FIG. 2C illustrates another example of the mounting ring 208 that includes a latch 208C. In some examples, latch 208C enables a user to manually override (e.g., release) the mounting strap 206B to emergently jettison the container 126 from the mobile jettison rack 200. Latch 208C may be utilized independent of, or in conjunction with, the fusible link 216 of FIG. 2B. In some examples, latch 208C is activated to release the strap 206B by way of a linkage 214. The linkage 214 may include a metal, rope, or other cable that is tensioned by a control lever to activate the latch 208C. By way of example, referring back to FIG. 2A, mobile jettison device 200 is further shown as including an override support structure 210. In some aspects, override support structure 210 is formed from the same rigid material as used to form the base frame 102. That is, the override support structure 210 may be constructed from metal (e.g., carbon steel, galvanized steel, etc.) square, rectangular, and/or round tubes. FIG. 2A also shows lever 212 as mounted to the override support structure 210. In some aspects, lever 212 is a push-pull lever coupled to the linkage 214 to activate the latch 208C and release the mounting strap 206B from the base frame 102.

In some aspects, override support structure 210 is secured to the deck 132 to one or more lashing points 138. In addition, the override support structure 210 is secured to the deck 132 separate and apart from the base frame 102. That is, the override support structure 210 may be located a safe distance away from the base frame 102 to allow manual jettisoning of the container 126 in emergent situations. For instance, in some examples, the linkage 214 may have a length of up to 75 feet to allow for the override support structure 210 to be placed a variable distance from the base frame 102 of between 0 and 75 feet, depending on the needs of the user and/or on the location of the available lashing points 138.

Figure 3A:
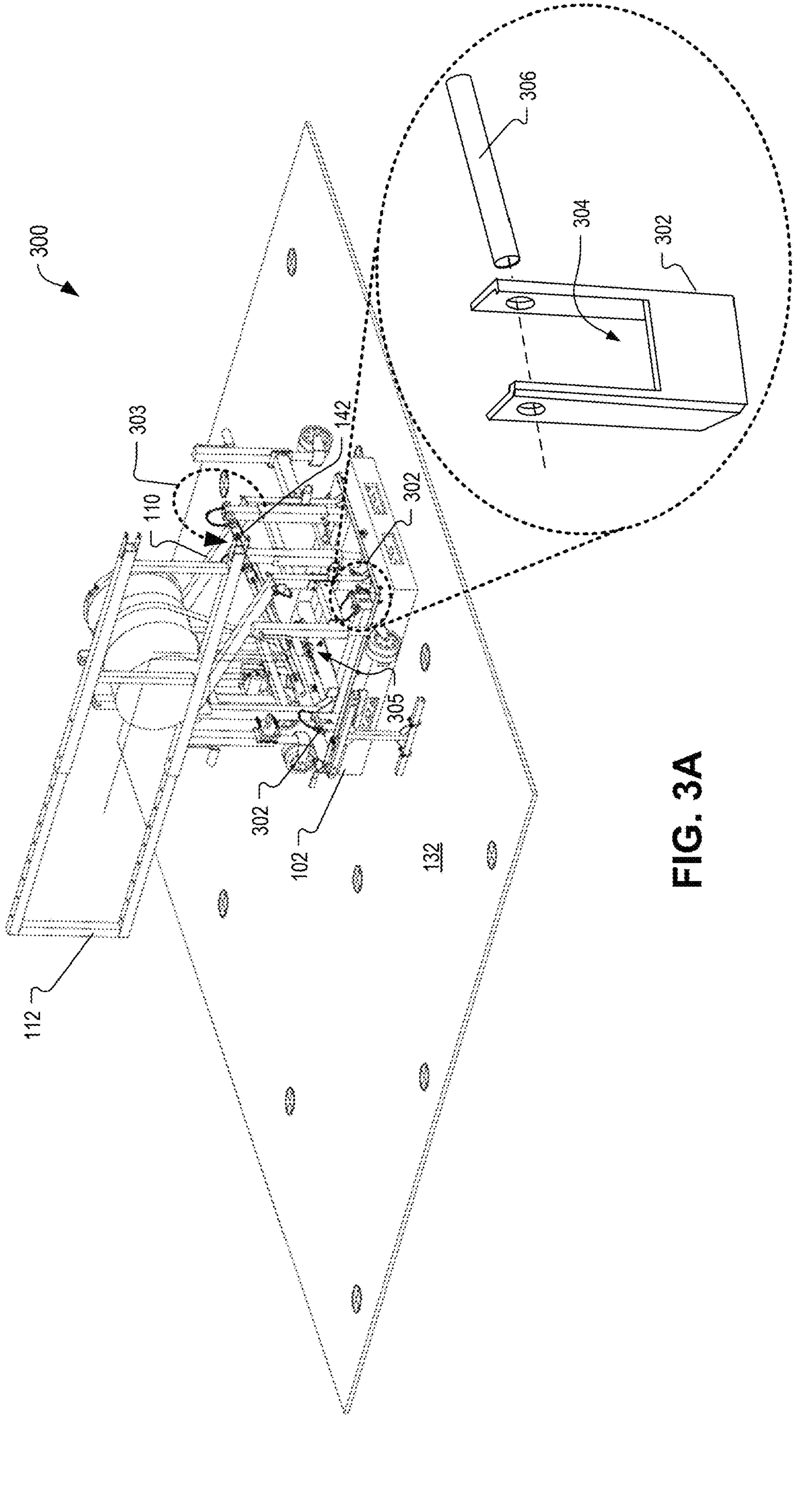
FIG. 3A illustrates an example mobile jettison rack with a storage mount for securing the adjustable ramp portion, in accordance with aspects of the disclosure.

FIG. 3A illustrates an example mobile jettison rack 300, in accordance with aspects of the disclosure. Mobile jettison rack 300 is one possible implementation of mobile jettison rack 100A of FIG. 1A, where like numerals are used to refer to like elements.

As mentioned above, in some examples, the adjustable ramp portion 112 may be selectively decoupled/removed from the fixed ramp portion 110 for storage and/or movement of the mobile jettison rack. Accordingly, base frame 102 of mobile jettison rack 300 is shown as including one or more storage mounts 302. Storage mounts 302 are configured to receive and secure the adjustable ramp portion 112 to a side of the base frame 102. For example, FIG. 3A further illustrates an expanded view of an example storage mount 302. As shown, storage mount 302 may include a channel 304 that is sized to receive the adjustable ramp portion 112 (e.g., channel 304 may have a width that is equal to or larger than a width of the tubing of the adjustable ramp portion 112). Storage mount 302 may also include a retention pin

306 for locking the adjustable ramp portion 112, once inserted into the channel 304.

FIG. 3A further illustrates ramp support member 142 rotated (e.g., see rotation 303) to an interior 305 of the base frame 102 for storage when the adjustable ramp portion 112 is removed and stored with the storage mounts 302.

Figure 3B:
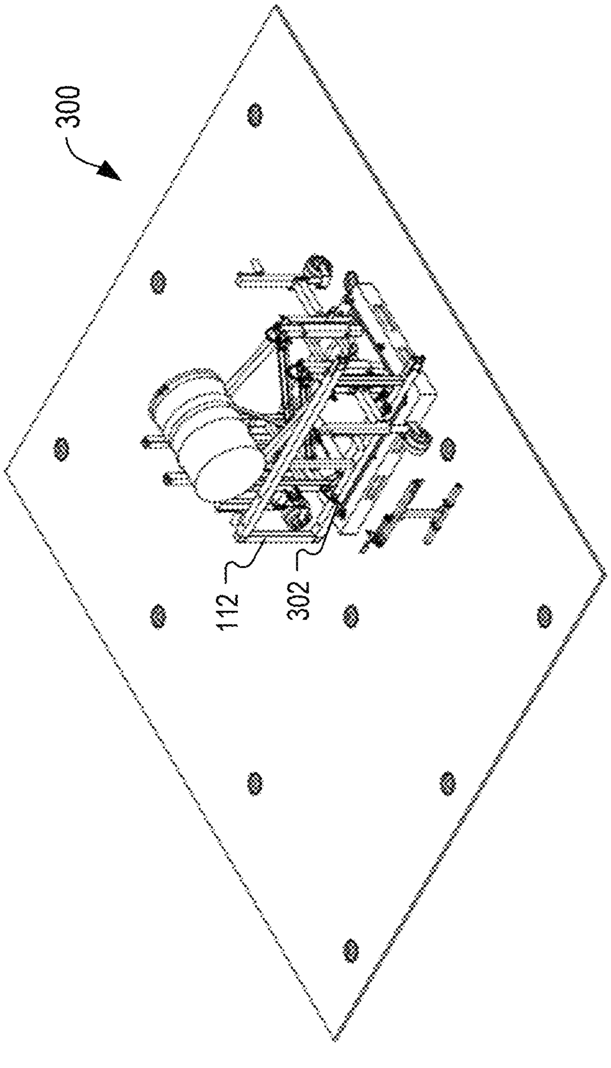
FIG. 3B illustrates a perspective view of the mobile jettison rack with the adjustable ramp portion secured with the storage mount of FIG. 3A.
Figure 3C:
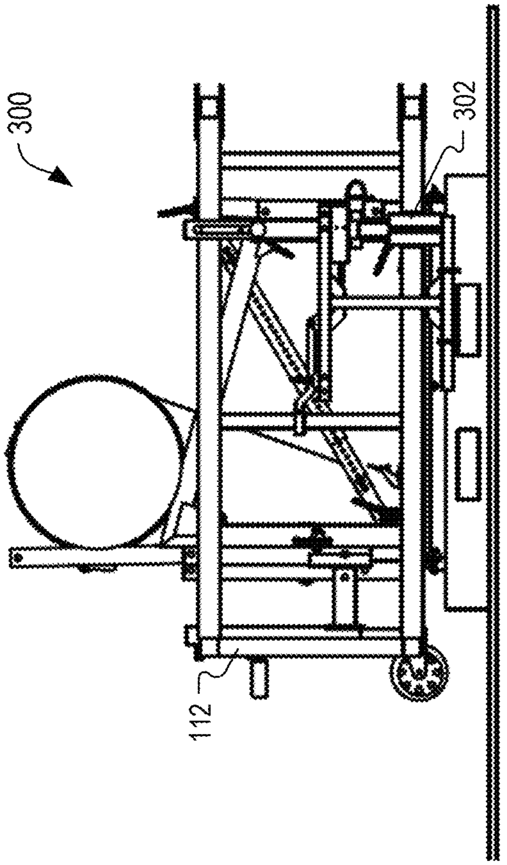
FIG. 3C illustrates a side view of the mobile jettison rack with the adjustable ramp portion secured with the storage mount of FIG. 3A.

FIG. 3B illustrates a perspective view of the mobile jettison rack 300 with the adjustable ramp portion 112 secured with the storage mount 302 of FIG. 3A. FIG. 3C illustrates a side view of the mobile jettison rack 300 with the adjustable ramp portion 112 secured with the storage mount 302 of FIG. 3A.

Figure 4:
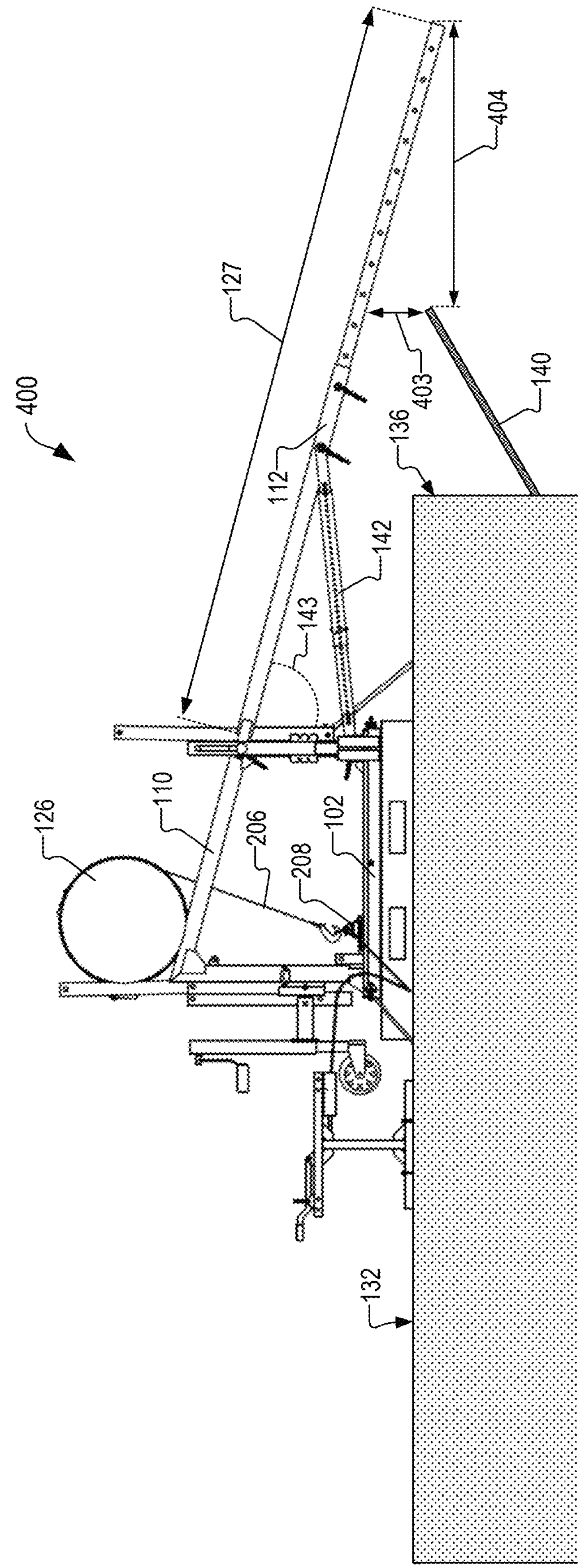
FIG. 4 illustrates a mobile jettison rack adjusted according to minimum clearance requirements, in accordance with aspects of the disclosure.

FIG. 4 illustrates a mobile jettison rack 400 adjusted according to minimum clearance requirements, in accordance with aspects of the disclosure. Mobile jettison rack 400 is one possible implementation of mobile jettison rack 100A of FIG. 1A, where like numerals are used to refer to like elements.

Some ships, platforms, and/or maritime guidelines/regulations may specify one or more minimum clearance requirements for the safe jettisoning of containers. The minimum clearance requirements may specify a minimum distance past (e.g., outboard) from an outermost side (e.g., outboard side 136) of the ship or from an obstacle (e.g., safety netting 140) that the container must be jettisoned. In addition, the minimum clearance requirements may also specify a minimum distance above the deck 132 or above an obstacle (e.g., safety netting 140), that the container must stay above during jettisoning. By way of example, FIG. 4 illustrates a minimum height requirement 403 and a minimum distance requirement 404 for the safe jettisoning of container 126. As shown, minimum height requirement 403 is the minimum height above a topmost point of the safety net 140. Similarly, minimum distance requirement 404 is the minimum distance past an outermost point of the safety net 140. Accordingly, the adjustable ramp portion 112 may be adjusted to conform to these minimum clearance requirements. In particular, the length 127 and/or the incline angle 143 may be adjusted, as discussed herein, such that the adjustable ramp portion 112 is at or above the minimum height requirement 403 and also extends past the safety net 140 at least the minimum distance requirement 404. In some implementations minimum height requirement 403 is six (6) inches and minimum distance requirement 404 is twenty-four (24) inches.

In addition, the components and functions represented by FIGS. 1A-4, as well as other components and functions described herein, may be implemented using any suitable means. Such means also may be implemented, at least in part, using corresponding structure as taught herein. For example, a lift means may correspond at least in some aspects to, for example, a lift jack (e.g., lift jack 104, wheel 108, or the like). Ramp means may correspond at least in some aspects to, for example, a ramp (e.g., ramp 106, fixed ramp portion 110, or the like). An adjustment means may correspond at least in some aspects to, for example, an adjustable ramp (e.g., adjustable ramp portion 112, or the like). A support means may correspond at least in some aspects to, for example, a ramp support member (e.g., ramp support member 142, or the like). A manual override means may correspond at least in some aspects to, for example, override support structure 210, lever 212, linkage 214, latch 208C, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mobile jettison rack, comprising:

a base frame;

at least one lift jack coupled to the base frame, wherein the at least one lift jack includes a wheel that is configured to contact a deck of a ship to elevate and mobilize the base frame over the deck when the at least one lift jack is extended; and a ramp coupled to the base frame, wherein the ramp includes:

a fixed ramp portion inclined towards a jettison side of the mobile jettison rack, wherein the fixed ramp portion is configured to receive and support a container that is to be emergently jettisoned towards the jettison side and over an outboard side of the ship; and an adjustable ramp portion coupled to the fixed ramp portion and inclined towards the jettison side, wherein the adjustable ramp portion has a length that is selectively adjustable to adjust a total length of the ramp.

2. The mobile jettison rack of claim 1, wherein the adjustable ramp portion comprises:

a telescoping tube having a plurality of perforations; and a retention pin inserted into at least one of the plurality of perforations to fix the length of the adjustable ramp portion.

3. The mobile jettison rack of claim 1, wherein the telescoping tube comprises a square metal tube.

4. The mobile jettison rack of claim 1, wherein the adjustable ramp portion is selectively removable to decouple the adjustable ramp portion from the fixed ramp portion.

5. The mobile jettison rack of claim 4, further comprising a retention pin inserted in a mounting hole of the adjustable ramp portion to selectively couple the adjustable ramp portion to the fixed ramp portion.

6. The mobile jettison rack of claim 4, wherein the base frame further comprises at least one storage mount for securing the adjustable ramp portion to a side of the base frame when the adjustable ramp portion is decoupled from the fixed ramp portion.

7. The mobile jettison rack of claim 1, further comprising a ramp support member coupled to the base frame and to the adjustable ramp portion to set an incline angle of the adjustable ramp portion.

8. The mobile jettison rack of claim 7, wherein a length of the ramp support member is selectively adjustable to adjust the incline angle of the adjustable ramp portion.

9. The mobile jettison rack of claim 8, wherein the ramp support member comprises:

a telescoping tube having a plurality of perforations; and a retention pin inserted into at least one of the plurality of perforations to fix the length of the ramp support member.

10. The mobile jettison rack of claim 7, wherein the ramp support member includes:

a first end coupled to the base frame; and a second end, distal from the first end, wherein the second end is configured to be selectively decoupled from the adjustable ramp portion.

11. The mobile jettison rack of claim 10, wherein the first end of the ramp support member is rotatably coupled to the base frame to enable the ramp support member to rotate to an interior of the base frame for storage when the second end is decoupled from the adjustable ramp portion.

12. The mobile jettison rack of claim 1, wherein the base frame further comprises:

one or more mounting rings configured to receive a mounting strap for securing the container to the fixed ramp portion.

13. The mobile jettison rack of claim 12, wherein the mounting strap includes a fusible link configured to fail and release the container from the fixed ramp portion in response to heat.

14. The mobile jettison rack of claim 12, wherein the one or more mounting rings comprise a latch for securing the mounting strap to the base frame, and wherein the mobile jettison rack further comprises:

an override support structure configured to be secured to the deck of the ship separate and apart from the base frame;

a lever mounted to the override support structure; and a linkage, coupled between the lever and the latch, wherein the latch is configured to release the mounting strap from the base frame in response to activation of the lever by a user.

15. The mobile jettison rack of claim 1, wherein the base frame further comprises a drip pan disposed between the deck and the fixed ramp portion to retain a liquid or solid material that escapes from the container.

16. A mobile jettison rack, comprising:

a base frame;

a lift means coupled to the base frame for selectively elevating and mobilizing the base frame over a deck of a ship;

a ramp means coupled to the base frame for receiving and supporting a container that is to be emergently jettisoned towards a jettison side of the mobile jettison rack over an outboard side of the ship; and an adjustment means coupled to the ramp means for selectively adjusting a total length of the ramp means, wherein the container is to be secured to the ramp means with one or more straps, and wherein the mobile jettison rack further comprises a manual override means to be disposed on the deck of the ship separate and apart from the base frame and coupled to selectively release the strap and jettison the container.

17. The mobile jettison rack of claim 16, further comprising:

a support means coupled between the base frame and the ramp means for selectively adjusting an incline angle of the ramp means towards the jettison side of the mobile jettison rack.

18. A mobile jettison rack, comprising:

a base frame;

a plurality of lift jacks coupled to the base frame, wherein at least one lift jack of the plurality of lift jacks includes a swivel wheel that is configured to contact a deck of a ship to elevate and mobilize the base frame over the deck when the plurality of lift jacks are extended;

a ramp coupled to the base frame, wherein the ramp includes:

a fixed ramp portion that includes a first pair of parallel tracks inclined towards a jettison side of the mobile jettison rack, wherein the first pair of parallel tracks are configured to receive and support a cylindrical container that is to be emergently jettisoned towards the jettison side and over an outboard side of the ship; and an adjustable ramp portion coupled to the fixed ramp portion, wherein the adjustable ramp portion includes a second pair of parallel tracks inclined towards the jettison side at an incline angle, wherein the second pair of parallel tracks have a length that is selectively adjustable to adjust a total length of the ramp; and a pair of ramp support members, each having a first end coupled to the base frame and a second end coupled to a respective one of the second pair of parallel tracks, wherein the pair of ramp support members have a selectively adjustable length to adjust the incline angle of the second pair of parallel tracks.

19. The mobile jettison rack of claim 18, wherein the base frame further comprises:

a plurality of tie-down rings configured to receive one or more straps for securing the base frame to one or more lashing points included on the deck of the ship.

* * * * *